United States Patent [19]
Gelenbe et al.

[11] Patent Number: 5,995,651
[45] Date of Patent: Nov. 30, 1999

[54] IMAGE CONTENT CLASSIFICATION METHODS, SYSTEMS AND COMPUTER PROGRAMS USING TEXTURE PATTERNS

[75] Inventors: Erol Gelenbe; Yutao Feng, both of Durham, N.C.

[73] Assignee: Duke University, Durham, N.C.

[21] Appl. No.: 08/678,157

[22] Filed: Jul. 11, 1996

[51] Int. Cl.[6] ..................................................... G06K 9/62
[52] U.S. Cl. ........................... 382/156; 382/155; 382/159
[58] Field of Search .................................. 382/155, 156, 382/159; 395/21, 22, 23, 24; 364/413.01, 413.02, 413.08, 413.12

[56] References Cited

U.S. PATENT DOCUMENTS

| | | | |
|---|---|---|---|
| 5,218,646 | 6/1993 | Sirat et al. ............................... | 382/155 |
| 5,260,871 | 11/1993 | Goldberg ........................... | 364/413.02 |
| 5,331,550 | 7/1994 | Stafford et al. .......................... | 382/155 |
| 5,426,684 | 6/1995 | Gaborski et al. . | |

FOREIGN PATENT DOCUMENTS

| | | |
|---|---|---|
| 0 396 171 | 7/1990 | European Pat. Off. . |
| 0 588 422 | 3/1994 | European Pat. Off. . |

OTHER PUBLICATIONS

V. Atalay et al., "Parallel Algorithm For Colour Texture Generation Using the Random Neural Network Model", International Journal of Pattern Recognition and Artificial Intelligence, vol. 6, No. 2–3 (1992), pp. 437–446.

V. Atalay et al., "*The Random Neural Network Model For Texture Generation*", International Journal of Pattern Recognition and Artificial Intelligence, vol. 6, No. 1 (1992) pp. 131–141.

Y. Feng et al., "Image Content Classification Using Geometric Recurrent Random Nets", Duke University (Dept. of Electrical Engineering), Durham, NC (Jul. 17, 1995), pp. 1–5.

E. Gelenbe, "Random Neural Networks with Negative and Positive Signals and Product Form Solution", Neural Computation, vol. 1, No. 4 (1989), pp. 502–510.

E. Gelenbe, "Stability of the Random Neural Network Model", Neural Computation, vol. 2, No. 2 (1990), pp. 239–247.

E. Gelenbe, "Learning in the Recurrent Neural Network", Neural Computation, vol. 5 (1993), pp. 154–164.

Atalay et al. (The Random Neural Network Model for Texture Generation, International Journal of Pattern Recognition and Artificial Intelligence, vol. 6, No. 1, 1992, pp. 131–142), 1992.

*Primary Examiner*—Jose L. Couso
*Assistant Examiner*—Duy M. Dang
*Attorney, Agent, or Firm*—Myers Bigel Sibley & Sajovec

[57] ABSTRACT

Image content classification methods, systems and computer programs repeatedly scan an image having an array of image pixels, with at least one random neural network. Each scan corresponds to one of multiple texture patterns. A corresponding texture pattern is compared to each of multiple image portions for each of the multiple scans. A value is assigned to each image portion, corresponding to the texture pattern having the highest coincidence. An array of pixels corresponding to the assigned values for the image portions may then be displayed. Highly accurate results may be obtained, at high speed, without the need for lengthy expert analysis.

30 Claims, 4 Drawing Sheets

IMAGE CONTENT CLASSIFICATION METHODS, SYSTEMS AND COMPUTER PROGRAMS USING TEXTURE PATTERNS

FIELD OF THE INVENTION

This invention relates to image processing methods, systems and computer programs, and more particularly to image content classification methods, systems and computer programs.

BACKGROUND OF THE INVENTION

Image processing methods, systems and computer programs are widely used in consumer, commercial and military applications to analyze images. One important aspect of image analysis is image content classification.

In particular, real world images generally contain large amounts of information. A significant portion of this information may only be perceptible to a highly trained expert. In image content classification, information is extracted from an image into components or regions which represent homogeneous elements of information.

For example, Magnetic Resonance Imaging (MRI) of the human brain presents an image content classification challenge. Magnetic resonance images generally contain massive amounts of information which generally requires lengthy interpretation by even the most highly trained human experts. Thus, the development of better image content classification methods, systems and computer programs for MRI can have a major impact on the science of brain development and function, as well as in helping to clarify the neuroanatomical substrates of psychiatric and neurological disorders.

Unfortunately, state-of-the-art computerized tools and software for MRI content classification may lead to error rates exceeding 5–10%, which may not be sufficiently accurate to analyze neuroanatomical and developmental changes of the human brain. Other techniques may be more accurate, but may require lengthy analysis by an expert. For example, advanced image segmentation techniques may use T1-weighted scans, T2-weighted scans, fast spin echo and T1-weighted volume scans. Data may be analyzed using grid-square counting. Unfortunately, although these techniques may have calibrated error of 1–5%, they generally are based on lengthy analysis by an expert. These techniques therefore may be impractical as the volume of available MRI scans become large, and when a statistically significant set of scans are used to draw conclusions of scientific interest and clinical value.

In view of the above, there remains a need for image content classification systems, methods and computer programs which are highly accurate and which may also be performed at high speed, without requiring lengthy expert analysis.

SUMMARY OF THE INVENTION

It is therefore an object of the invention to provide improved image content classification methods, systems and computer programs.

It is still another object of the present invention to provide image content classification methods, systems and computer programs which can be highly accurate.

It is yet another object of the present invention to provide image content classification methods, systems and computer programs which may operate at high speeds, so that large volumes of image data may be processed.

It is still another object of the present invention to provide image content classification methods, systems and computer programs which do not require lengthy expert analysis.

These and other objects are provided, according to the present invention, by image content classification systems, methods and computer programs which identify texture patterns in an image using repeated scans of one or more trained random neural networks over the image. By using a trained random neural network, highly accurate results may be obtained without the need for lengthy expert analysis. By repeatedly (simultaneously or successively) scanning the image, high speed results may be obtained.

In particular, image content classification methods, systems and computer programs according to the invention repeatedly (simultaneously or successively) scan an image comprising an array of image pixels, with at least one random neural network. Each scan corresponds to one of a plurality of texture patterns. A corresponding texture pattern is compared to each of a plurality of image portions for each of the plurality of scans. Each image portion comprises at least one image pixel and preferably comprises a single image pixel. A value is assigned to each image portion, corresponding to one of the plurality of texture patterns having the highest coincidence. An array of pixels corresponding to the assigned values for the image portions may then be displayed.

Preferably, prior to repeatedly scanning the image, the at least one random neural network is trained to recognize the plurality of texture patterns. Training is preferably accomplished by obtaining a plurality of samples of each of the plurality of texture patterns from an expert and by applying the plurality of samples to the at least one random neural network to train the network. Preferably, an expert provides an identification of the plurality of texture patterns and a plurality of samples for each of the identified texture patterns.

Scanning according to the invention may be accomplished serially or in parallel. When accomplished in parallel, a plurality of random neural networks is provided, corresponding to the plurality of texture patterns. Each of the plurality of random neural networks is scanned once over the array of image pixels. Alternatively, a single random neural network is provided and the single random neural network is scanned over the array of image pixels a plurality of times, being separately trained or loaded with appropriate weights before each pass, corresponding to the plurality of image textures.

Random neural networks which are used according to the invention preferably comprise a bidirectionally interconnected neuron array, each interconnect of which has a weight corresponding to an image texture associated therewith. The bidirectionally connected array emits excitation and inhibition pulses. Random neural networks have heretofore been utilized to generate texture. See, for example, the publication by Atalay, coinventor Gelenbe and Yalabik entitled "*The Random Neural Network Model for Texture Generation*", International Journal of Pattern Recognition and Artificial Intelligence, Vol. 6, No. 1, 1992, pp. 131–141; and the publication by Atalay and coinventor Gelenbe entitled "*Parallel Algorithm for Colour Texture Generation Using the Random Neural Network Model*", International Journal of Pattern Recognition and Artificial Intelligence, Vol. 6, Nos. 2 and 3, 1992, pp. 437–446, the disclosures of both of which are hereby incorporated herein by reference.

In another aspect of the present invention, if none of the image patterns has a coincidence which exceeds a threshold, an error value is assigned to that image portion. The error value may be used to indicate that the image portion does not adequately correspond to any of the image textures, and may be used to detect abnormal textures. Abnormal textures can also be detected if each of the plurality of networks provides very similar coincidence values.

By classifying an image based on texture patterns which represent detailed granular interdependencies, a highly accurate classification may be obtained which correlates well with human expert classifications. Lengthy expert analysis is not required. Moreover, the random neural network may classify images in parallel and at high efficiency. Highly accurate and efficient image content classification methods, systems and computer programs are thereby obtained.

DETAILED DESCRIPTION OF PREFERRED EMBODIMENTS

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

It will be understood by those having skill in the art that each of the method steps and each of the elements of the present invention may be performed by hardware, software, or combinations thereof. Thus, for example, a random neural network may be implemented using hardware, software or combinations of hardware and software. Similarly, scanning of an image may be implemented using hardware, software or combinations of hardware and software. As yet another example, coincidence comparison may be performed using hardware, software or combinations thereof. Accordingly, each of the means and steps of the present invention shall be construed as covering a hardware, software or combined hardware/software embodiment. A computer program product for classifying image content includes a computer-readable storage medium having computer-readable program code means embodied in the medium, wherein the computer-readable program code means implement the random neural network(s) and other elements of the invention.

Figure 1:
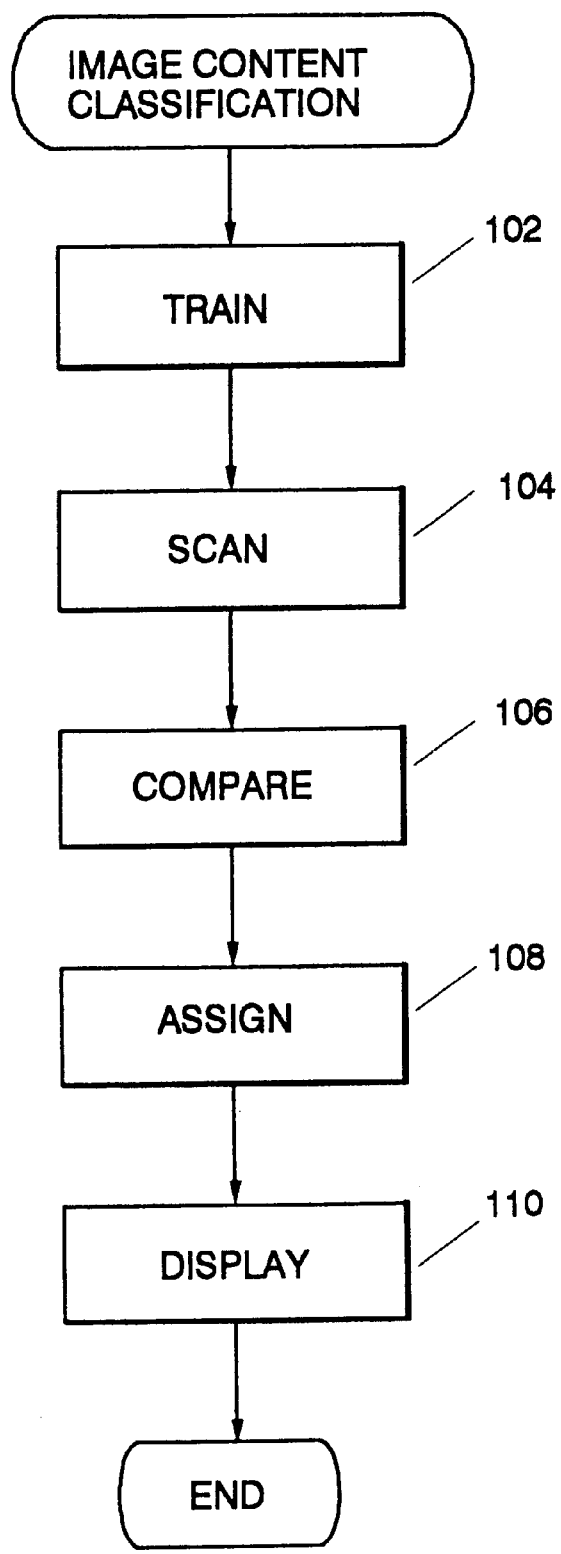
FIG. 1 is a flow chart illustrating operations which are performed by image content classification methods and systems according to the present invention.

Referring now to FIG. 1, operations for image content classification according to the present invention will now be described. It will be understood by those having skill in the art that each of the operations may be performed by a computer program executing on a general purpose processor, by special purpose hardware or combinations thereof. As shown in FIG. 1, image content classification, according to the present invention, includes the general operations of training at least one random neural network to recognize a plurality of texture patterns (Block 102). At Block 104, an image comprising an array of image pixels is repeatedly scanned with at least one random neural network. Each scan corresponds to one of the plurality of texture patterns.

At Block 106, a corresponding texture pattern is compared to each of a plurality of image portions, for each of the plurality of scans. Each image portion corresponds to at least one image pixel. At Block 108, a value is assigned to each image portion corresponding to one of the plurality of texture patterns having highest coincidence. At Block 110, an array of pixels corresponding to the assigned values for the image portions is displayed.

A specific application of image content classification according to the present invention will now be described, in the field of Magnetic Resonance Imaging (MRI) scans of the human brain. In MRI image content classification, it is generally desired to classify portions of the human brain as either being white matter or gray matter. In order to perform these classifications, two random neural networks are first trained to recognize white matter and gray matter (Block 102). Each random neural network is trained by providing a plurality of samples, such as twenty samples, of gray matter and white matter to each neural network respectively. Training procedures for random neural networks are known to those having skill in the art. For example, training procedures for random neural networks are described in the above-cited Atalay et al. publications, and will not be described further herein.

It will also be understood that multiple random neural networks need not be trained. Rather, a single random neural network may be trained for each classification and may be sequentially loaded with the required weights for white and gray matter, or for other regions, or for anomalies which are sought. It will also be understood that training of the neural networks may require human expert input of at least two types. First, an expert may need to determine which texture patterns should be identified, for example the need to identify white matter and gray matter. Then, a plurality of samples may be obtained from an expert which represent each of the identified texture patterns.

After training, the image is scanned (Block 104). It will be understood by those having skill in the art that the image may be sequentially scanned by a single neural network. During a first scan, the image may be scanned for white matter, and during a second pass it may be scanned for gray matter. Alternatively, two separate neural networks, one for gray matter and one for white matter, may scan the network in parallel (or serially). Regardless of the implementation which is used, a corresponding texture pattern is compared to each of a plurality of image portions for each of the scans (Block 106). For each image portion which is scanned, each texture pattern is compared to the image portion, for example, by determining a mean squared error between the texture which is recognized by the trained random neural network, and the image portion.

Then, each image portion is assigned a value which corresponds to one of the plurality of texture patterns which has the highest coincidence or least mean squared error (Block 108). In other words, when the image portion is scanned by both the gray matter and white matter trained random neural networks, if the image portion has a least mean square error for the gray matter, it is assigned a value corresponding to gray matter. The image portion is then displayed as including gray matter (Block 110). Thus, the texture patterns are used to classify portions of the image as being either of one texture or another. If, however, neither texture coincides with the image portion above a certain threshold, i.e. the least mean square error of both neural networks is high, this image portion may be classified as neither gray matter nor white matter. This classification may indicate a tumor or other abnormal structure in the MRI. Abnormal textures may also be detected if each of the plurality of networks provides very similar coincidence values.

Additional discussion of image content classification methods and systems according to the present invention will now be provided. The present invention is based on the postulate that the detailed granular or textural structure within a region of an image may provide essential information which can be effectively used for segmentation by a random neural network. The random neural network can capture detailed granular interdependencies, as well as geometric properties and symmetries in the images under consideration. Thus, cross-dependencies between neurons in the network relate to properties of local neighborhoods in the image which require network feedback.

A random neural network is a pulsed neural network which is described by coinventor Gelenbe in a publications entitled "*Random Neural Networks With Negative and Positive Signals and Product Form Solution*", Neural Computation, Vol. 1, No. 4, 1989, pp. 502–510 and "*Stability of the Random Neural Network Model*", Neural Computation, Vol. 2, No. 2, 1990, pp. 239–247. The random neural network captures elements of the pulsed behavior of a neural network via "positive" (excitation) and "negative" (inhibition) pulses or signals which travel among the neurons as they become excited and fire. Signals can either arrive at a neuron from outside the network or from other neurons. Each neuron accumulates positive as positive signals arrive, while negative signals will deplete the "potential" or accumulated signal level, of a neuron to which they arrive. A neuron can fire, by starting to send out signals to other neurons, if its total accumulated signal level or potential at a given instant exceeds a threshold. This is referred to as the neuron being "excited". An excited neuron fires signals out to other neurons, or back to itself, or to the outside of the network, at random intervals. Each time a neuron fires, its signal level is depleted. The random neural network can also allow for depletion of any neuron's signal over time.

Generally, the neurons relate directly to pixel positions (x,y) in an image. Therefore, the notation $N_i(x,y)$ is used to denote the neuron corresponding to a position (x,y) in the i-th neural network being considered. The state of that neuron will be represented by $q_i(x,y)$. In one example of an image, gray level images are represented as a rectangular grid of pixels. However, the invention also applies to color images and to other encodings or representations of an image. The invention can also apply to three or higher dimensional representations.

In order to classify the contents of an image, it is assumed that the image contains a finite set of M regions $R_1 \ldots R_M$ which are to be identified. Even though in many cases the sum of all regions will cover the whole image, this need not be the case. Accordingly, an image may contain areas outside of the regions of interest which are not classified.

Each region in an image may be composed of possibly non-continuous areas. Furthermore, a region may be characterized by its detailed granular properties, including gray levels, but especially by local dependencies between neighboring pixels. The contents of an image are classified by providing M recurrent neural networks $L_1 \ldots L_M$, each of which is specialized in capturing the properties of one of the regions. Each network $L_i$ is trained using a set of input samples which are known to belong to the region $R_i$.

When the content of an image is to be classified, each of the M networks is applied to the image. The image is decomposed into blocks (image portions) of small size, i.e. of size much smaller than the image itself. Preferably, the image portion is one pixel in size, so a pixel-by-pixel classification is performed, based on texture. Each block in the image is classified as belonging to some region $R_i$, if the neural network which provides the best match for that region is network $L_i$. If none of the M networks provides a sufficiently good match for a block, then that block may be set aside as not being classified into any of the M regions being considered.

The network structure includes M different single layer recurrent networks denoted by $L_i$, i=1 ... n. $L_i$ includes a set of neurons $N_i(x,y)$ where (x,y) refers to a pixel position and $q_i(x,y) \in [0, 1]$ represents the state of $N_i(x,y)$. Thus, a specific neuron in the network $L_i$ is associated with a specific pixel in the image.

Each $N_i(x,y)$ interacts with other neurons in the same network $L_i$ via weights representing excitation, denoted by $w_i^+(x,y,d,D)$, or inhibition denoted by $w_i^-(x,y,d,D)$. Here d refers to a particular direction from (x,y), while D refers to Euclidean distance. For example, d can encode the 8 main directions (N, NE, E, SE, S, SW, W, NW) with the integers 1 ... 8. Thus (x,y,d,D) will designate a specific neuron position relative to the position (x,y). For example (x,y,1,1) designates the neuron position (x,y+1), while (x,y,3,2) designates the neuron position (x+2,y). I(x,y) denotes the gray-level of the pixel in the image's (x,y) position. The external excitation signal which feeds into $N_i(x,y)$ is denoted $\Lambda_i(x,y)$, and is an adequately coded representation of I(x,y).

For each network $L_i$, the weights are learned from a certified sample of pixels which belong to region $R_i$. This will be carried out using a random neural network learning process. For an n-neuron random neural network, it has been shown that the fully connected learning process is of computation complexity $O(n^3)$. See the publication by coinventor Gelenbe entitled "*Learning in the Recurrent Random Neural Network*", Neural Computation, Vol. 5, 1993, pp. 154–164. Due to the local connection involved in the networks which are used, the actual complexity of learning for the networks which are used is linear in the size of the network.

Figure 2:
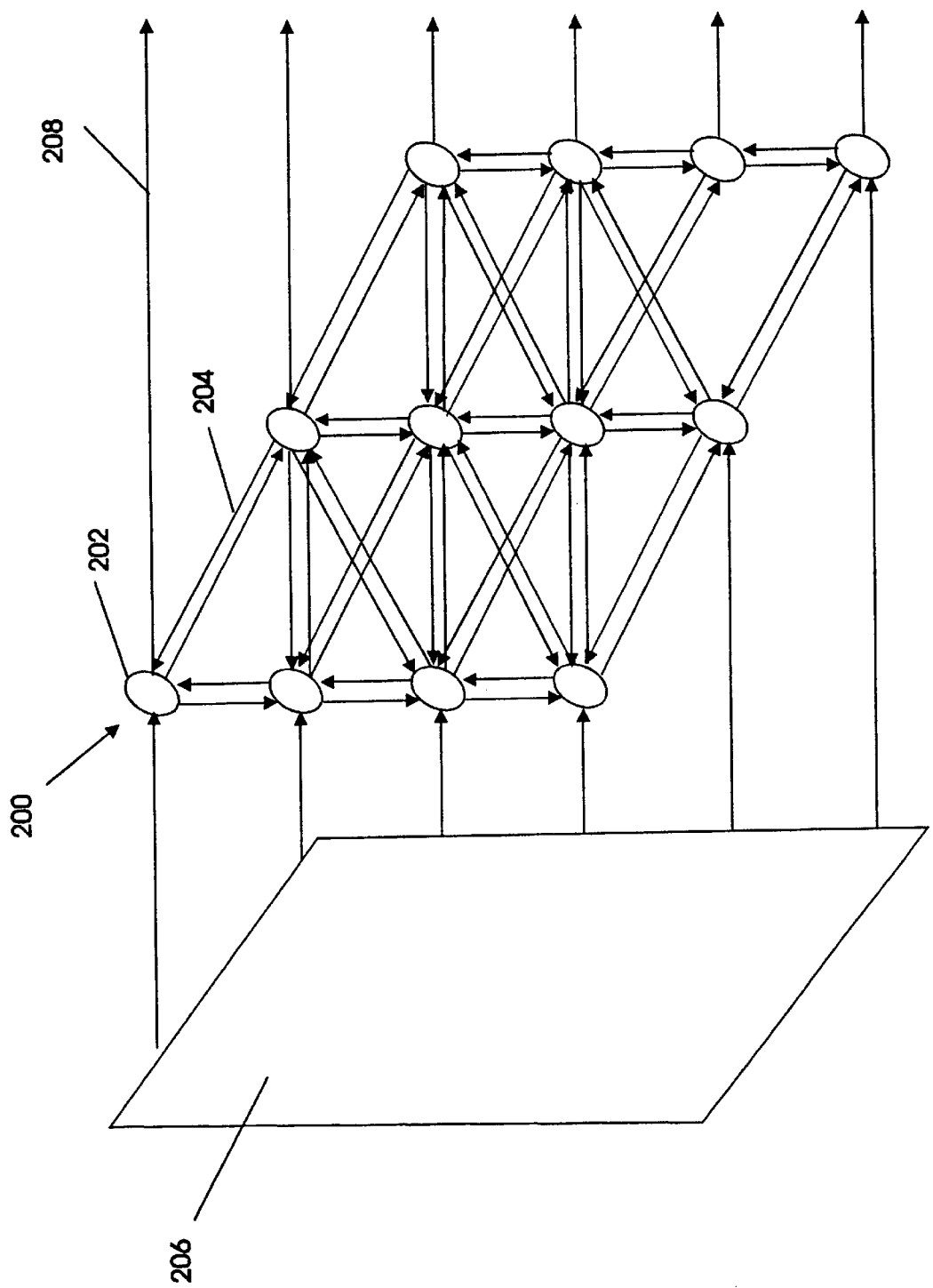
FIG. 2 is a block diagram illustrating a random neural network which may be used in methods and systems according to the present invention.

A random neural network structure described above is illustrated in FIG. 2. Neural network 200 includes a plurality of neurons 202 arranged in a neuron array, with bidirectional connections 204 therebetween. Image data 206 is applied to the neural network and output 208 is produced. Connections between neurons may be limited to the eight nearest neighbors. Rather than constructing a network covering the whole image, it can be much more efficient and sufficiently accurate to implement each $L_i$ as a small, for example 5×5 neuron, network. Each of these networks may be trained as follows.

A small number of 5×5 sample blocks of pixels which are representative of region $R_i$ are used as the training set for $L_i$. The input to neuron $N_i(x,y)$ is the corresponding observed pixel gray level I(x,y) from the sample block, and the target value to be attained by the neuron state $q_i(x,y)$ as a result of the learning process is also the encoded version of corresponding pixel value I(x,y) in the sample block. The sum of square differences between the states of the $L_i$ neurons when they are fed the block B pixel values, and the pixel values themselves are used as the error function $E_i$ for the training process:

$$E_i = \frac{1}{2} \sum_{(x,y) \in B} [I(x, y) - q_i(x, y)]^2$$

Training may be carried out using the learning process described in the above-cited Gelenbe publication for each sample block B selected for region $R_i$. Thus, network $L_i$ "learns" the texture characteristics of $R_i$ by storing the characteristics in its weights.

If M regions are to be classified in the image, for each region $R_i$, a random neural network $L_i$ is trained so that it stores interconnection weights which will allow it to mimic region i. Once the training process is complete, all the blocks of the image to processed are scanned and every block of the image is fed into every one of the networks $L_1 \ldots$ n. A block in the image is classified as belonging to region j if $L_j$ gives the smallest mean squared error between the block and output of each of the networks, as long as this error remains below an acceptable threshold. Otherwise, that particular block is preferably not classified.

Figure 3:
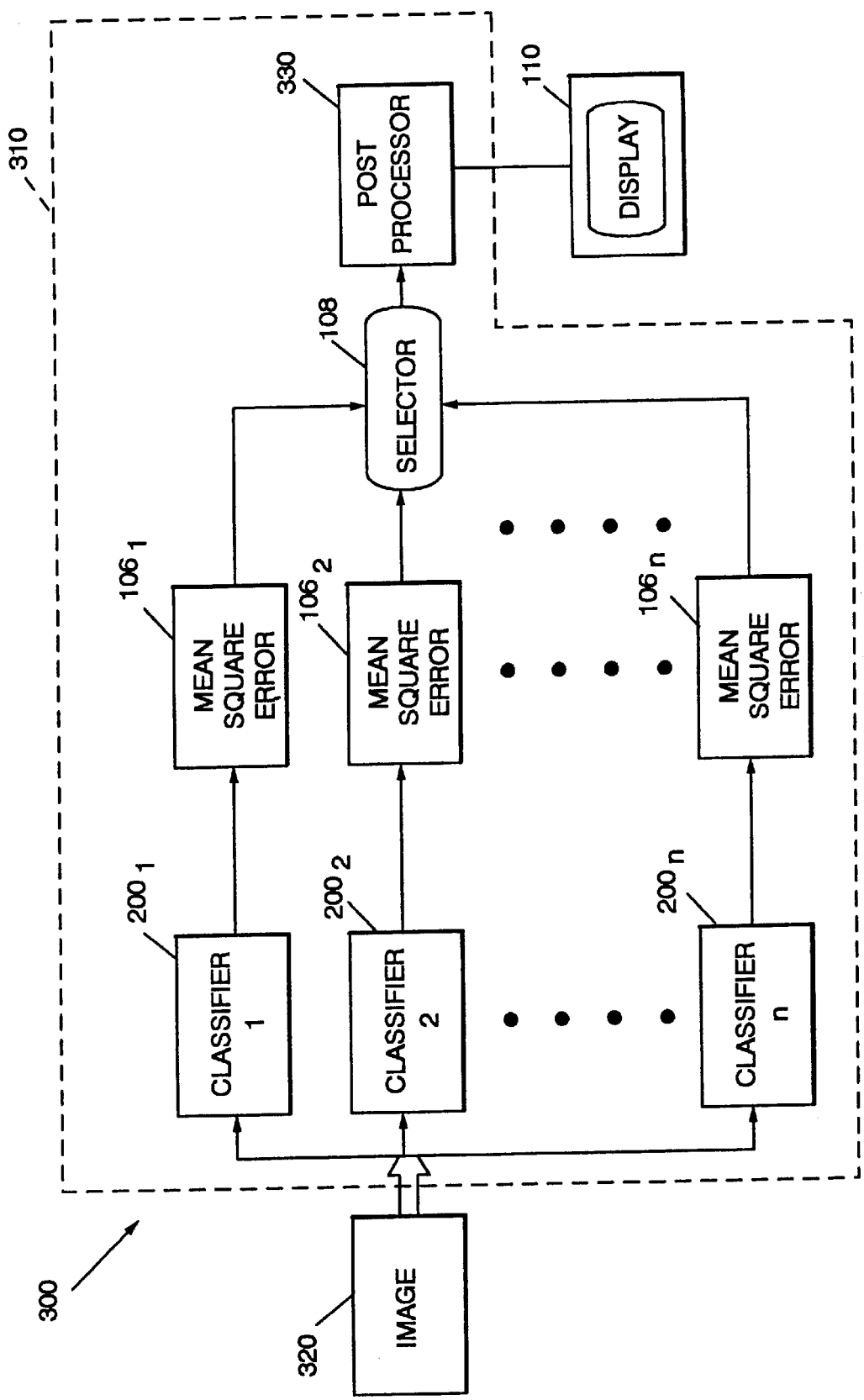
FIG. 3 is a block diagram of an image content classification system according to the present invention.

Referring to FIG. 3, an embodiment of an image content classification system 300 according to the invention is shown. Image processing classification system 300 repeatedly scans an image 320 with an image content classification processor 310, and may display the results on display 110. Image content classification processor 310 includes at least one random neural network classifier $200_1$–$200_n$. Each neural network corresponds to a particular classification denoted Class 1-Class n. Each neural network 200 is trained as already described. It will be understood by those having skill in the art that a plurality of neural networks $200_1$–$200_n$ may be scanned over an image in parallel as shown in FIG. 3, or a single neural network may be serially scanned over an image after being loaded with appropriate weights for a particular content classification.

Still referring to FIG. 3, a plurality of comparison units 106, such as mean square error determining units $106_1$–$106_n$ determine a mean square error between the texture which is stored in the associated random neural network 200 and an image portion. The mean square errors are applied to an assignment unit 108, such as a selector which assigns to the image portion, the classification corresponding to the neural network having the smallest mean square error, i.e. the highest coincidence. The classifications may then be applied to a post-processing unit 330 for display on a display 110. It will be understood by those having skill in the art that neural networks 200, mean square error units 106, assignment unit 108 and post-processing unit 330 may be embodied in an image content classification processor by software which executes on a general purpose computer, by hardware, or by combinations thereof.

It will also be understood by those having skill in the art that the entire image 320 may also be stored in image content classification processor 310 and then "scanned", or the image portions may be scanned serially by inputting sequential portions into the processor. Accordingly, as used herein, "scanning" may be implemented by a physical scanning or by a manipulation of image buffers in the image content classification system. Moreover, scanning may take place by moving (physically or in buffers) the image relative to the random neural network(s), moving the neural network (s) relative to the image, or both.

The following example is provided to illustrate image content classification methods, systems and computer programs according to the present invention, but is not to be construed as limitations on the invention.

EXAMPLE

Image content classification methods and systems according to the present invention have been applied to classification of gray matter and white matter from magnetic resonance images of the human brain. Current magnetic resonance imaging technology obtains multispectral characteristics of the image: T1, T2 (relaxation time) and PD (photon density) images. Information extracted from these multispectral images can be used for three-dimensional reconstruction and visualization of the brain for medical purposes. For instance, quantified tissue volumes are frequently used for clinical studies in neuroradiology, leading to information about neuropathology or in neuropsychiatry. Measurement of tissue volumes may be used to diagnose disorders.

In order to apply classification methods and systems according to the present invention, a gray level histogram analysis was carried out to reduce the depth of the image and filter irrelevant surrounding areas. Training sets were then obtained for the different regions which are to be classified. These training sets were composed of 5×5 pixel blocks and were used to train the two random neural networks. The network assigned to a specific region was trained with twelve training blocks taken from the gray matter and white matters region.

Figure 4:
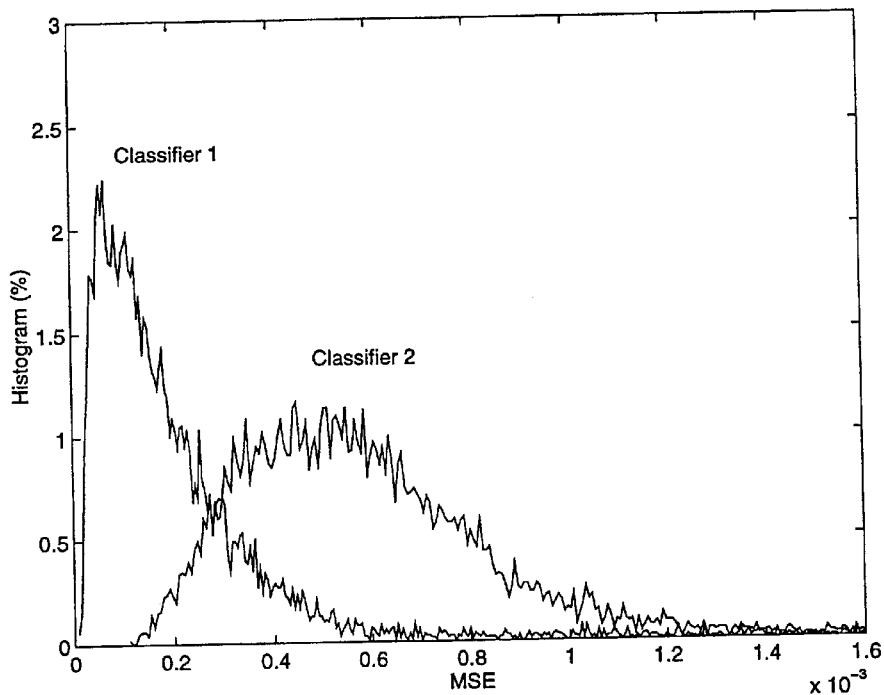
FIG. 4 graphically illustrates a histogram of the mean squared error for two trained random neural network classifiers on the region of the first classifier.
Figure 5:
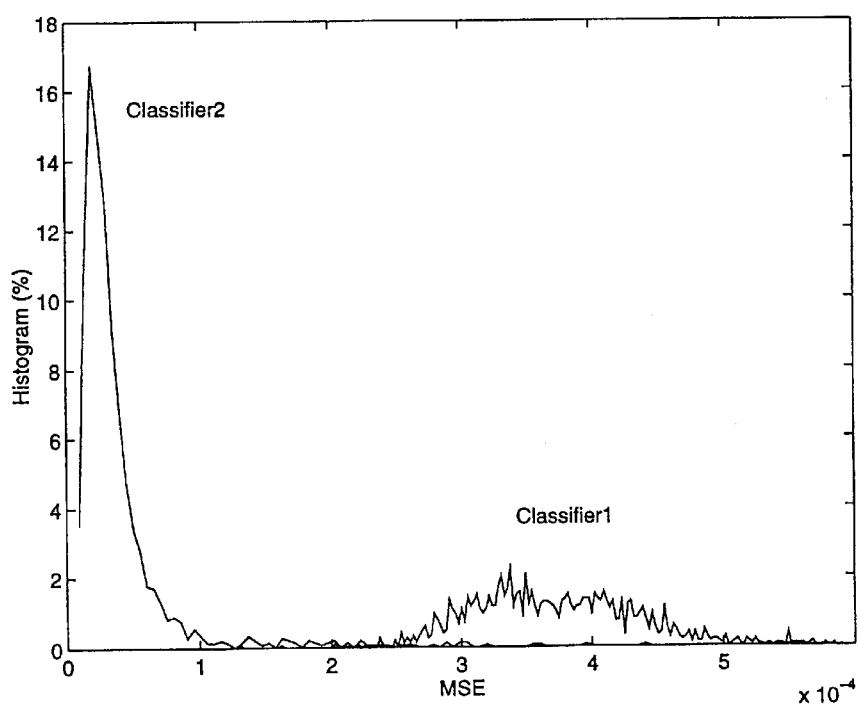
FIG. 5 graphically illustrates a histogram of the mean squared error for two trained random neural network classifiers on the region of the second classifier.

Experimental results confirmed that when the random neural network is trained for a certain region, it can consistently provide an output which is very close to the input block, as long as the input block is taken from the region for which it has been trained. Otherwise, the network output exhibits a very significant difference from the input block, as shown in FIGS. 4 and 5. FIG. 4 graphically illustrates a histogram of the mean squared error (MSE) for the two trained random neural network classifiers (Classifier 1 and Classifier 2) on the region of Classifier 1. FIG. 5 graphically illustrates a histogram of the MSE for the two trained random neural network classifiers on the region of Classifier 2.

This close coincidence is used to classify the regions of the brain from magnetic resonance imaging scans, by feeding each block in the array of image pixels into each of the two trained random neural network classifiers. The class that gives the smallest mean squared error between the pixel values of the block being tested and the random neural network output is selected as the region to which each block belongs. Excluding the region borders, the empirically observed percentages of correct classification, i.e. the probability that the mean square error from the correct classifier is larger than that from the wrong classifier are $P_1$=98.41% for the region of Classifier 1 and $P_2$=98.64% for the region of Classifier 2. These percentages are similar to those which can be obtained by a human expert carrying out manual volumetric analysis of brain magnetic resonance images.

Accordingly, methods, systems and program products are provided to identify and quantify image content such as cortical regions of the brain. Image content classification methods, systems and program products according to the invention may be usable by radiologists, clinicians and medical researchers. The present invention may help advance understanding of the neuroanatomical substrate of important disorders, as well as of normal brain development.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. An image content classification method comprising the steps of:
    repeatedly scanning an image comprising an array of image pixels, with at least one random neural network, each scan of the image with at least one random neural network corresponding to one of a plurality of texture patterns, wherein said repeatedly scanning step is preceded by the step of training said at least one random neural network to recognize said plurality of texture patterns, and wherein said training step comprises the steps of obtaining a plurality of samples of each of said plurality of texture patterns and applying said plurality of samples to said at least one random neural network;
    comparing a corresponding texture pattern to each of a plurality of image portions, each comprising at least one image pixel, for each of said plurality of scans of the image with at least one random neural network; and
    assigning to each image portion, a value corresponding to one of said plurality of texture patterns having highest coincidence.

2. A method according to claim 1 wherein said repeatedly scanning step comprises the steps of:
    providing a plurality of random neural networks corresponding to said plurality of texture patterns; and
    scanning each of said plurality of random neural networks once over said array of image pixels.

3. A method according to claim 1 wherein said repeatedly scanning step comprises the step of:
    providing a single random neural network; and
    scanning said single random neural network over said array of image pixels a plurality of times, corresponding to said plurality of image textures.

4. A method according to claim 1 wherein said assigning step comprises the step of selecting the image texture pattern having least mean squared error.

5. A method according to claim 1 wherein said random neural network comprises a bidirectionally interconnected neuron array, each neuron of which has a weight corresponding to an image texture pattern associated therewith.

6. A method according to claim 5 wherein each neuron of said bidirectionally connected array emits excitation and inhibition pulses.

7. A method according to claim 1 wherein said assigning step is followed by the step of:
    displaying an array of pixels representing the assigned values for the image portions.

8. A method according to claim 1 wherein said assigning step comprises the steps of:
    assigning to each image portion, a value corresponding to one of said plurality of texture patterns having highest coincidence, if each of said image patterns has a coincidence for the image portion which exceeds a threshold; and
    assigning an error value otherwise.

9. A method according to claim 1 wherein said obtaining step comprises the steps of:

obtaining from an expert, an identification of said plurality of texture patterns; and
obtaining from an expert, a plurality of samples for each of the identified texture patterns.

10. A method according to claim 1 wherein said image portion is a single image pixel.

11. An image content classification method comprising the steps of:
    at least one random neural network;
    means for repeatedly scanning an image comprising an array of image pixels, with at least one random neural network, each scan of the image with at least one random neural network corresponding to one of a plurality of texture patterns;
    means for training said at least one random neural network to recognize said plurality if texture patterns, wherein said training means comprises means for obtaining a plurality of samples of each of said plurality of texture patterns, and means, responsive to said obtaining means, for applying said plurality of samples to said at least one random neural network;
    means, responsive to said repeatedly scanning means, for comparing a corresponding texture pattern to each of a plurality of image portions, each comprising at least one image pixel, for each of said plurality of scans of the image with at least one random neural network; and
    means, responsive to said comparing means, for assigning to each image portion, a value corresponding to one of said plurality of texture patterns having highest coincidence.

12. A system according to claim 11:
    wherein said at least one random neural network comprises a plurality of random neural networks corresponding to said plurality of texture patterns; and
    wherein said means for repeatedly scanning an image comprises means for scanning each of said plurality of random neural networks once over said array of image pixels.

13. A system according to claim 11:
    wherein said at least one random neural network comprises a single random neural network; and
    wherein said means for repeatedly scanning an image comprises means for scanning said single random neural network over said array of image pixels a plurality of times, corresponding to said plurality of image textures.

14. A system according to claim 11 wherein said assigning means comprises means for selecting the image texture pattern having least mean squared error.

15. A system according to claim 11 wherein said random neural network comprises a bidirectionally interconnected neuron array, each neuron of which has a weight corresponding to an image texture pattern associated therewith.

16. A system according to claim 15 wherein each neuron of said bidirectionally connected array emits excitation and inhibition pulses.

17. A system according to claim 11 further comprising:
    means, responsive to said assigning means, for displaying an array of pixels representing the assigned values for the image portions.

18. A system according to claim 11 wherein said assigning means comprises:
    means for assigning to each image portion, a value corresponding to one of said plurality of texture patterns having highest coincidence, if each of said image patterns has a coincidence for the image portion which exceeds a threshold; and means for assigning an error value otherwise.

19. A system according to claim 11 wherein said obtaining means comprises:

first means for obtaining from an expert, an identification of said plurality of texture patterns; and second means, responsive to said first means, for obtaining from an expert, a plurality of samples for each of the identified texture patterns.

20. A system according to claim 11 wherein said image portion is a single image pixel.

21. A computer program product for image content classification, said computer program product comprising:

a computer-readable storage medium having computer-readable program code means embodied in said medium, said computer-readable program code means comprising:

a computer-readable program code means for implementing at least one random neural network;

computer-readable program code means for repeatedly scanning an image comprising an array of image pixels, with at least one random neural network, each scan of the image with at least one random neural network corresponding to one of a plurality of texture patterns;

computer-readable program code means for training said at least one random neural network to recognize said plurality if texture patterns, wherein said training means comprises computer-readable program code means for obtaining a plurality of samples of each of said plurality of texture patterns, and computer-readable program code means, responsive to said obtaining means, for applying said plurality of samples to said at least one random neural network;

computer-readable program code means, responsive to said repeatedly scanning means, for comparing a corresponding texture pattern to each of a plurality of image portions, each comprising at least one image pixel, for each of said plurality of scans of the image with at least one random neural network; and computer-readable program code means, responsive to said comparing means, for assigning to each image portion, a value corresponding to one of said plurality of texture patterns having highest coincidence.

22. A computer program product according to claim 21:

wherein said at least one random neural network comprises a plurality of random neural networks corresponding to said plurality of texture patterns; and wherein said means for repeatedly scanning an image comprises means for scanning each of said plurality of random neural networks once over said array of image pixels.

23. A computer program product according to claim 21:

wherein said at least one random neural network comprises a single random neural network; and wherein said means for repeatedly scanning an image comprises means for scanning said single random neural network over said array of image pixels a plurality of times, corresponding to said plurality of image textures.

24. A computer program product according to claim 21 wherein said assigning means comprises means for selecting the image texture pattern having least mean squared error.

25. A computer program product according to claim 21 wherein said random neural network comprises a bidirectionally interconnected neuron array, each neuron of which has a weight corresponding to an image texture pattern associated therewith.

26. A computer program product according to claim 25 wherein each neuron of said bidirectionally connected array emits excitation and inhibition pulses.

27. A computer program product according to claim 21 further comprising:

computer-readable program code means, responsive to said assigning means, for displaying on a display an array of pixels representing the assigned values for the image portions.

28. A computer program product according to claim 21 wherein said assigning means comprises:

computer-readable program code means for assigning to each image portion, a value corresponding to one of said plurality of texture patterns having highest coincidence, if each of said image patterns has a coincidence for the image portion which exceeds a threshold; and computer-readable program code means for assigning an error value otherwise.

29. A computer program product according to claim 21 wherein said obtaining means comprises:

first computer-readable program code means for obtaining from an expert, an identification of said plurality of texture patterns; and second computer-readable program code means, responsive to said first means, for obtaining from an expert, a plurality of samples for each of the identified texture patterns.

30. A computer program product according to claim 21 wherein said image portion is a single image pixel.

* * * * *

UNITED STATES PATENT AND TRADEMARK OFFICE
CERTIFICATE OF CORRECTION

PATENT NO.    : 5,995,651
DATED         : November 30, 1999
INVENTOR(S)   : Gelenbe et al.

It is certified that error appears in the above-identified patent and that said Letters Patent is hereby corrected as shown below:

Column 10, line 17  please delete "if" and substitute -- of -- therefor.
Column 11, line 19  please delete "a" prior to "computer-readable program code"
Column 11, line 28  please delete "if" and substitute -- of -- therefor.

Signed and Sealed this

Twenty-fifth Day of July, 2000

Attest:

Q. TODD DICKINSON

Attesting Officer

Director of Patents and Trademarks